US006500066B1

(12) United States Patent
Bower et al.

(10) Patent No.: US 6,500,066 B1
(45) Date of Patent: Dec. 31, 2002

(54) METHOD FOR INCREASING GAMBLING OPERATION UTILIZATION BY GAMBLERS

(76) Inventors: Thomas J. Bower, 11 Sandy Cove Rd., Lake Wylie, SC (US) 29710; Wayne R. Rothman, 434 Berwick Cir., Aurora, OH (US) 44202

( * ) Notice: Subject to any disclaimer, the term of this patent is extended or adjusted under 35 U.S.C. 154(b) by 0 days.

(21) Appl. No.: 09/475,346

(22) Filed: Dec. 30, 1999

(51) Int. Cl.[7] .................................................. A63F 13/00

(52) U.S. Cl. ............................ 463/20; 463/12; 463/13; 463/16; 463/25; 273/292

(58) Field of Search ............................. 463/20, 16, 25, 463/13, 12; 273/292

(56) References Cited

FOREIGN PATENT DOCUMENTS

GB 2211975 A * 12/1989 ............. 273/138 A

OTHER PUBLICATIONS http://www.winnersluck.com/calculat.htm—pp. 1–2, 1999.*
Internet Search—LookSmart, 2001.*
Internet search—Alta Vista company, 2000.*

* cited by examiner

*Primary Examiner*—Benjamin H. Layno
*Assistant Examiner*—Dolores R. Collins
(74) *Attorney, Agent, or Firm*—Adams, Schwartz & Evans, P.A.

(57) ABSTRACT

A method for increasing gambling operation utilization by gamblers, including the steps of determining the effect on the utilization of the gambling operation occurring as a result of variations in percentage of losses or winnings incurred by a gambler who loses or wins a particular wager at the gambling operation, communicating the percentage variation in losses or winnings on the wager correlated to the effect on the utilization of the gambling operation to gamblers or potential gamblers, and varying the percentage of losses or winnings incurred by a gambler on the wager by an amount correlated to the effect on the utilization of the gambling operation occurring as a result of the variation in the percentage of losses or winnings by the gambler, wherein the variation of the percentage of loss always results in losses less than the amount wagered and the variation in the percentage of winnings always results in winnings greater than the amount wagered.

21 Claims, No Drawings

METHOD FOR INCREASING GAMBLING OPERATION UTILIZATION BY GAMBLERS

BACKGROUND OF THE INVENTION

This invention relates to a method for increasing gambling operation utilization by gamblers, and has application in conventional gambling operations such as casinos, video poker outlets and sports books, horse and dog tracks, and in more recently developed internet-based on-line gambling operations which operate similarly to conventional casinos. The purposes of the invention include increasing the playing time of gamblers, creating incentives to play particular games, and to increasing the utilization of the gambling operation based on given utilization factors. All of these purposes are referred to below generally as increasing the utilization of the gambling operation.

Gambling involves placing a wager, or bet, of a specified amount of money on the outcome of an event, such as the pull of a slot machine handle, the roll of dice, drawing particular cards or combinations of cards, or the outcome of a sporting event. The gambler either wins or loses the wager. If the wager is won, the gambler wins the amount of the wager multiplied by the "odds" on the wager. For example, a wager of $100.00 with odds of three-to-one results in winnings of $300.00. If the wager is lost, the gambler typically loses the full amount of the wager, i.e., the full $100.00.

There are many factors that affect the utilization of gambling operations, including the time of day, day of the week, season of the year, weather, competitive entertainment events or other gambling operations, economic conditions, and holiday periods. It is well known that gambling operation utilization varies based on these utilization factors, among others.

Known casino gambling incentives include free or reduced-price rooms, meals, drinks and entertainment, rebates based upon an initial deposit by the gambler and bet volume. Gambling operations have developed sophisticated formulae for tracking betting volume, level of play and the like. However, none of these systems is known to be tied directly to gambling losses.

SUMMARY OF THE INVENTION

Therefore, it is an object of the invention to provide a method for increasing gambling operation utilization by gamblers.

It is another object of the invention to provide a method of increasing the playing time and thus the number of bets made by gamblers.

It is another object of the invention to create incentives for gamblers to play particular betting games.

It is another object of the invention to create incentives for gamblers to play betting games at particular times of day or on different days of the week.

These and other objects of the present invention are achieved in the preferred embodiments disclosed below by providing a method for increasing gambling operation utilization by gamblers. The method includes the steps of determining the effect on the utilization of the gambling operation occurring as a result of variations in percentage of losses or winnings incurred by a gambler who loses or wins a particular wager at the gambling operation, communicating the percentage variation in losses or winnings on the wager to gamblers or potential gamblers, and varying the percentage of losses or winnings incurred by a gambler on the wager by an amount correlated to the effect on the utilization of the gambling operation occurring as a result of the variation in the percentage of losses or winnings by the gambler.

According to one preferred embodiment of the invention, the variation of the percentage of loss always results in losses less than the amount wagered and/or the variation in the percentage of winnings always results in winnings greater than the amount wagered.

According to one preferred embodiment of the invention, the gambling operation is a casino.

According to another preferred embodiment of the invention, the gambling operation is an internet-based on-line gambling operation.

According to yet another preferred embodiment of the invention, the variation in losses or winnings is based on the effect on the utilization of the gambling operation during different times of day during which the gambling operation operates.

According to yet another preferred embodiment of the invention, the variation in losses or winnings is based on the effect on the utilization of the gambling operation during different days of the week during which the gambling operation operates.

According to yet another preferred embodiment of the invention, the variation in losses or winnings is based on the effect on the utilization of different games offered by the gambling operation.

According to yet another preferred embodiment of the invention, the variation in losses or winnings is based on the effect on the utilization of the gambling operation during different seasons of the year.

According to yet another preferred embodiment of the invention, the variation in losses or winnings is based on the effect on the utilization of the gambling operation during different weather conditions.

According to yet another preferred embodiment of the invention, the variation in losses or winnings is based on the effect on the utilization of the gambling operation during different holidays.

According to yet another preferred embodiment of the invention, the variation in losses or winnings is based on the effect on the utilization of the particular games of chance available for play at the gambling operation.

According to yet another preferred embodiment of the invention, the variation in losses or winnings is based on the effect on the utilization of the gambling operation in relation to other competitive gambling operations.

According to yet another preferred embodiment of the invention, the variation in losses or winnings is based on the effect on the utilization of the gambling operation in relation to the type of gambler desired by the gambling operation.

According to yet another preferred embodiment of the invention, the reduction of loss or increase in winnings is credited to the gambler immediately after the result of the wager is determined.

According to yet another preferred embodiment of the invention, the credit representing the reduction of loss or increase in winnings is valid for use only at the gambling operation issuing the credit.

DESCRIPTION OF THE PREFERRED EMBODIMENT AND BEST MODE

Gambling businesses are governed by the laws of supply and demand, just as are other types of businesses. It is well known that the "demand" for gambling operations varies by the time of day, the day of the week, the season of the year, weather, holiday periods, competition from other gambling businesses and other forms of entertainment, among others.

The principal "price" entailed in gambling is the bet, or wager, placed by the player. As in any supply and demand equation, there is a particular demand at a particular price. Generally, if price is lowered, demand increases, and if price increases, demand decreases. If a relatively small change in price results in a relatively large change in demand, the demand is "elastic." If a relatively large change in price results in a relatively small change in demand, the demand is "inelastic." The elasticity of demand can be determined by use of formulae, or empirically by actually noting the change in demand that results from change in price.

One significant factor in the relationship between price and demand is the extent to which the purchaser—in this case, the gambler—is aware of the real price and the changes in price.

Free or reduced-price rooms, meals, drinks and entertainment, rebates based upon an initial deposit by the gambler and bet volume are all known ways of reducing the price of placing a wager and thereby providing a greater incentive to gamble. However, these incentives are relatively indirect. They do not necessarily induce the gambler to play longer or place larger or more bets. In many cases, these techniques may not even be recognized by the player as having an effect on the price of gambling.

A core incentive to gamble resides in the fact that any single bet, if won, can wipe out numerous losses. Thus, providing an additional betting opportunity at no or reduced cost to a gambler who is losing is a powerful incentive to the gambler to continue betting in the hopes of winning and recouping lost bets.

In accordance with the invention, losses and winnings by the gambler are controlled and varied in such as way as to draw more players, skew the player towards particular games, lengthen the time spent betting, increase the number of bets and thereby increase the utilization of the facilities of the gambling operation. By properly and directly communicating the variation in the percentage of losses and winnings actually incurred to players and potential players, incremental business can be attracted. It is an important feature of the invention that the communication to the player is direct, immediate, repetitive and variable. As is well known, the gambling operation, i.e., the "house", always wins in the long run. Therefore, incremental increases in gambling activity is certain to translate into greater net revenue to the gambling operation.

There already exists a wide variety of techniques available to monitor variation in gambling operation business based upon the factors referred to above. Physical casinos use sophisticated managerial software to monitor levels of play at all games, including slot machines. Statistical information is also available for monitoring and predicting the ebb and flow of gambling activity.

The more recent phenomenon of internet-based, on-line gambling also presents opportunities to monitor the level of play and provide incentives for incremental play. There are a finite number of players that can access on-line casinos at any given time. This number depends on the number of phone lines, system bandwidth, server capacity, software limitations, as well as other limitations, such as time of day, and others referred to above. There are now an enormous number of directly competitive on-line casinos which can be readily and quickly accessed by a potential player, who can quickly determine which one of any number of such on-line casinos he wishes to patronize.

The invention includes the method of monitoring the level of play in relation to server capacity and other limiting factors, and varying the percentage of losses or winnings incurred by a gambler on the wager by an amount correlated to the effect on the utilization of the gambling operation occurring as a result of the variation in the percentage of losses or winnings by the gambler. The variation of the percentage of loss can be made to always result in losses less than the amount wagered and/or the variation in the percentage of winnings can be made to always result in winnings greater than the amount wagered.

This information can be conveyed to the potential player on the log-in page, and advertised on banner advertising throughout the internet. The advertising can be "stand alone", or can be linked to the on-line casino.

This practice is intended to attract play from other sites by offering a more attractive loss ratio than the competition. A properly programmed general purpose computer can monitor any desired condition and alter the loss and win ratio continuously. The loss ratio can also be used to attract particular player types or groups. For example, if a "high roller" is evaluating one on-line casino versus another, the loss ratio can be used to entice the player by allowing a rate to be negotiated which is agreeable to all parties. In effect, different loss ratios can be offered to different catagories of bettors.

Similarly, the method can be used to provide an enhanced "instant gratification" factor designed to convert observers to players by advertising a special loss ratio for a set period of time, or for particular games.

A gambling operation incurs essentially the same fixed costs, no matter how may players are gambling at a particular time. Any additional play increases the opportunity for the gambling operation to increase revenue at little or no additional cost. The method is extremely flexible, and can include crediting the account of the bettor, providing an instant rebate, or otherwise reducing the cash cost to the bettor.

The method according to the invention is illustrated by the following examples.

EXAMPLE 1

A casino determines that it can increase the number of players during weekday mornings by 10 percent by reducing the players' losses to 90 percent of the wager. Thus, a losing wager of $1,000 results in a loss of $900 rather than $1,000. The $100 is returned to the player, leaving the player with $100 with which to place an additional bet. If the $100 is bet and lost, the player still has $10 with which to place an additional bet. Thus, the player is provided with three play opportunities instead of one. Of course, if the $10 is bet and lost, the player still has $1 to bet and is given a fourth opportunity to play and, of course, to win.

EXAMPLE 2

An on-line casino wishes to increase the number of players playing a particular game during a particular time of day. The log-in page advertises that a player playing the particular game during particular time of day will lose only 80 percent of each losing wager, and will win 105 percent of each winning wager. Thus, a losing wager of $1,000 results in a loss of $800 rather than $1,000. The $200 is credited to the player, leaving the player with $200 with which to place an additional bet or to add to an additional bet of a larger amount. If $200 is bet and lost, the player still has $40 with which to place an additional bet. A winning wager of $1,000 results in winnings of $1,050 rather than $1,000, thus enabling the player to place and win a larger bet.

EXAMPLE 3

A casino determines that it can increase the number of players betting more than $1,000 on a single wager by 10 percent by reducing the players' losses to 90 percent of the wager. Thus, a losing wager of $1,000 results in a loss of $900 rather than $1,000. The $100 is returned to the player, leaving the player with $100 to add to $900 to make up the next $1,000 wager. If the $1,000 is bet and lost, the player still has $100 with which to place an additional $1,000 bet.

EXAMPLE 4

An on-line casino determines that it can maximize the number of players throughout the day by monitoring the number of players on-line and in real-time increasing the amount of any wagering loss discount when the number of players drops. A computer monitors the number of players on-line to the server. When the number of players is 97 percent or greater of the server capacity, the new players' losses are reduced by 5 percent. Thus, a losing wager of $100 results in a loss of $95 rather than $100. The $5 is credited to the player for placement of an additional bet. If the number of players on-line drops to between 97 and 90 percent of server capacity, the casino immediately advertises on the casino site that the losses on all wagers for new players for some fixed period of time is reduced by 15 percent. This advertising can also be instantly relayed to related web sites and links.

EXAMPLE 5

A horse racing track wishes to spread the wagers being made over a longer period of time to reduce lines at betting windows and to reduce the number of betting windows needed, as well as increase the number of bettors. The track determines that it can increase the number of bettors placing bets more than 10 minutes before a race by 30 percent by reducing those players' losses to 90 percent of the wager, while maintaining full losses for those bettors placing bets less than 10 minutes before the race. Thus, a losing wager of $1,000 by a bettor who places a bet 15 minutes before the race results in a loss of $900 rather than $1,000. The $100 is returned to the bettor or credited to the next bet. If the $100 is bet and lost, the player still has $10 with which to place an additional bet, and so on.

EXAMPLE 6

A casino determines that it can increase the number of players playing certain high-bet slot machines by 10 percent by reducing the players' losses to 90 percent of the amount fed into the slot machine when at least 10 losing plays on the machine have occurred. In such event, the slot machine is programmed to pay the player a credit in the form of a token good for an additional play. The program can require that the token be played on the same machine or on any machine requiring the same or lessor bet in the same casino, or any other desired condition. Thus, a slot machine player losing 10 $10 bets is paid off with a token worth $10. The player thus is given 11 plays for the cost of 10, and thereby has 11 chances to win instead of 10.

EXAMPLE 7

A sports book determines that it can increase the number of bettors by 10 percent by reducing the players' losses to 90 percent of the amount lost in prior wagers. In such event, a losing wager of $1,000 results in a loss of $900 rather than $1,000. The loss reduction can be credited to a future bet, credited to the bettor's credit card or paid out as a rebate, as desired and as practical, based upon how the bet was placed, i.e, in person, by telephone or on-line. The $100 returned to the bettor leaves the bettor with $100 with which to place an additional bet. If the $100 is bet and lost, the bettor still has $10 with which to place an additional bet. Thus, the bettor is provided with three play opportunities instead of one. Of course, if the $10 is bet and lost, the bettor still has $1 to bet and is given a fourth opportunity to play and, of course, to win. In addition, the rebate could be offered as payment for betting tips offered by the book on future bets.

In each of the above examples, it is unimportant how the determination was made that varying the percentage of losses or winnings incurred by a gambler on the wager correlates in a certain way to the utilization of the gambling operation occurring as a result of the variation in the percentage of losses or winnings by the gambler. The determination may be made using data gathered for other purposes by the casino, assumptions based on statistical models and historical data or empirically by actually studying the effects achieved during an operation of the method according to the invention and adjusting the percentages accordingly.

A method for increasing gambling operation utilization is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A method for increasing gambling operation utilization by gamblers, comprising the steps of:

(a) determining the effect on the utilization of the gambling operation occurring as a result of variations in percentages of losses or winnings incurred by a gambler who loses or wins a particular wager at the gambling operation;

(b) using a preselected advertising source to communicate to a gambler or potential gambler a discount in the cost of at least one wager prior to the wager by the gambler or potential gambler for enticing the gambler or potential gambler to place the wager; and (c) varying the percentage of losses or winnings incurred by a gambler on the wager by discounting the cost of at least one wager by an amount correlated to the effect on the utilization of the gambling operation occurring as a result of a variation in the percentage of losses or winnings by the gambler for permitting the gambler to accept a discount on the wager as a means of obtaining a refund, thereby preventing the gambler from losing the entire wager.

2. A method according to claim 1, wherein said gambling operation is a casino.

3. A method according to claim 1, wherein said gambling operation is an internet-based on-line gambling operation.

4. A method according to claim 1, wherein the variation in losses or winnings is based on the effect on the utilization of the gambling operation during different times of day during which the gambling operation operates.

5. A method according to claim 1, wherein the variation in losses or winnings is based on the effect on the utilization of the gambling operation during different days of the week during which the gambling operation operates.

6. A method according to claim 1, wherein the variation in losses or winnings is based on the effect on the utilization of different games offered by the gambling operation.

7. A method according to claim 1, wherein the variation in losses or winnings is based on the effect on the utilization of the gambling operation during different seasons of the year.

8. A method according to claim 1, wherein the variation in losses or winnings is based on the effect on the utilization of the gambling operation during different weather conditions.

9. A method according to claim 1, wherein the variation in losses or winnings is based on the effect on the utilization of the particular games of chance available for play at the gambling operation.

10. A method according to claim 1, wherein the variation in losses or winnings is based on the effect on the utilization of the gambling operation during different holiday periods.

11. A method according to claim 1, wherein the variation in losses or winnings is based on the effect on the utilization of the gambling operation in relation to other competitive gambling operations.

12. A method according to claim 1, wherein the variation in losses or winnings is based on the effect on the utilization of the gambling operation in relation to the type of gambler desired by the gambling operation.

13. A method according to claim 1, wherein the reduction of loss or increase in winnings is credited to the gambler immediately after the result of the wager is determined.

14. A method according to claim 13, wherein the credit representing the reduction of loss or increase in winnings is valid for use only at the gambling operation issuing the credit.

15. A method according to claim 1, wherein the variation of the percentage of loss always results in losses less than the amount wagered and the variation in the percentage of winnings always results in winnings greater than the amount wagered.

16. A method for increasing gambling operation utilization by gamblers, comprising the steps of:

(a) determining the effect on the utilization of the gambling operation occurring as a result of variations in percentages of losses or winnings incurred by a gambler who loses a particular wager at the gambling operation;

(b) using a preselected advertising source to communicate to a gambler or potential gambler a discount in the cost of at least one wager prior to a wager by the gambler or potential gambler for enticing the gambler or potential gambler to place the wager; and (c) varying the percentage of losses incurred by a gambler on the wager by discounting the cost of at least one wager by an amount correlated to the effect on the utilization of the gambling operation occurring as a result of a variation in the percentage of losses by the gambler caused by discounting the cost of at least one previous wager, thereby permitting the gambler to accept a discount on the wager as a means of obtaining a refund, thereby preventing the gambler from losing the entire wager.

17. A method according to claim 1 or 16, wherein the variation of the percentage of losses always results in losses less than the amount wagered.

18. A method according to claim 17, wherein the media advertising source further comprises a Web site cooperating with said global communications network.

19. A method according to claim 18, wherein the media advertising source further comprises a log-in page on said Web site.

20. A method according to claim 17, wherein said media advertising source comprises a banner advertisement cooperating with a global communications network.

21. A method according to claim 1 or 16, wherein said preselected advertising source comprises a media advertising source.

* * * * *